US006937451B2

(12) United States Patent
Ulrich et al.

(10) Patent No.: US 6,937,451 B2
(45) Date of Patent: *Aug. 30, 2005

(54) ALCI WITH RESET LOCKOUT AND INDEPENDENT TRIP

(75) Inventors: Richard J. Ulrich, Whitestone, NY (US); William R. Ziegler, East Northport, NY (US); Nicholas L. Disalvo, Levittown, NY (US); Frantz Germain, Rosedale, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 689 days.

This patent is subject to a terminal disclaimer.

(21) Appl. No.: 10/166,338

(22) Filed: Mar. 21, 2001

(65) Prior Publication Data

US 2004/0090722 A1 May 13, 2004

(51) Int. Cl.[7] .................................................. H02H 3/00
(52) U.S. Cl. .......................................................... 361/42
(58) Field of Search ............................ 361/42, 114, 50; 335/18

(56) References Cited

U.S. PATENT DOCUMENTS

| | | | |
|---|---|---|---|
| 3,309,571 A | 3/1967 | Gilker | |
| 3,538,477 A | 11/1970 | Walters et al. | |
| 3,702,418 A | 11/1972 | Obenhaus | |
| 3,731,154 A | 5/1973 | Torosian | |
| 3,846,649 A | 2/1975 | Doyle | |
| 3,872,354 A | 3/1975 | Nestor et al. | |
| 3,949,336 A | 4/1976 | Dietz | |
| 4,002,951 A | 1/1977 | Halbeck | |
| 4,034,266 A | 7/1977 | Virani et al. | |
| 4,034,360 A | 7/1977 | Schweitzer, Jr. | |
| 4,063,299 A | 12/1977 | Munroe | |
| 4,086,549 A | 4/1978 | Slater et al. | |
| 4,223,365 A | 9/1980 | Moran | |
| 4,237,435 A | 12/1980 | Cooper et al. | |
| 4,316,230 A | 2/1982 | Hansen | |
| 4,442,470 A | 4/1984 | Misencik | |
| 4,521,824 A | 6/1985 | Morris et al. | |
| 4,567,456 A | 1/1986 | Legatti | |
| 4,574,260 A | 3/1986 | Franks | |
| 4,578,732 A | 3/1986 | Draper et al. | |
| 4,587,588 A | 5/1986 | Goldstein | |
| 4,595,894 A * | 6/1986 | Doyle et al. | 335/18 |
| 4,631,624 A | 12/1986 | Dorak et al. | |
| 4,719,437 A | 1/1988 | Yun | |
| 4,802,052 A | 1/1989 | Brant et al. | |
| 4,851,951 A | 7/1989 | Foster, Jr. | |
| 4,901,183 A | 2/1990 | Lee | |
| 4,967,308 A | 10/1990 | Morse | |
| 4,979,070 A | 12/1990 | Bodkin | |
| 5,148,344 A | 9/1992 | Astley et al. | |
| 5,202,662 A | 4/1993 | Bienwald et al. | |
| 5,223,810 A | 6/1993 | Van Haaren | |

(Continued)

FOREIGN PATENT DOCUMENTS

| | | |
|---|---|---|
| AU | 759587 | 7/2003 |
| EP | 0 526 071 A | 2/1993 |
| GB | 830018 | 3/1960 |
| GB | 2207823 | 2/1989 |
| GB | 2290181 A | 12/1995 |
| WO | WO 96/01484 A | 1/1996 |
| WO | PCT/US99/19319 | 3/2000 |
| WO | PCT/US00/22955 | 3/2001 |
| WO | PCT/US01/32562 | 4/2002 |

*Primary Examiner*—Brian Sircus
*Assistant Examiner*—James A. Demakis
(74) *Attorney, Agent, or Firm*—Paul J. Sutton

(57) ABSTRACT

Resettable circuit interrupting devices, such as ALCI and IDCI devices, that include reset lockout portion are provided.

1 Claim, 12 Drawing Sheets

U.S. PATENT DOCUMENTS

| | | | |
|---|---|---|---|
| 5,224,006 | A | 6/1993 | MacKenzie et al. |
| 5,229,730 | A | 7/1993 | Legatti et al. |
| 5,347,248 | A | 9/1994 | Herbert |
| 5,418,678 | A | 5/1995 | McDonald |
| 5,448,443 | A | 9/1995 | Muelleman |
| 5,477,412 | A | 12/1995 | Neiger et al. |
| 5,517,165 | A | 5/1996 | Cook |
| 5,541,800 | A | 7/1996 | Misencik |
| 5,555,150 | A | 9/1996 | Newman |
| 5,594,398 | A | 1/1997 | Marcou et al. |
| 5,600,524 | A | 2/1997 | Neiger et al. |
| 5,617,284 | A | 4/1997 | Paradise |
| 5,625,285 | A | 4/1997 | Virgilio et al. |
| 5,637,000 | A | 6/1997 | Osterbrock et al. |
| 5,661,623 | A | 8/1997 | McDonald et al. |
| 5,665,648 | A | 9/1997 | Rosen |
| 5,694,280 | A | 12/1997 | Zhou |
| 5,706,155 | A | 1/1998 | Neiger et al. |
| 5,729,417 | A | 3/1998 | Neiger et al. |
| 5,805,397 | A | 9/1998 | MacKenzie |
| 5,815,363 | A | 9/1998 | Chu |
| 5,825,602 | A | 10/1998 | Tosaka et al. |
| 5,844,765 | A | 12/1998 | Kato et al. |
| 5,847,913 | A | 12/1998 | Turner et al. |
| 5,875,087 | A | 2/1999 | Spencer et al. |
| 5,933,063 | A | 8/1999 | Keung et al. |

| | | | |
|---|---|---|---|
| 5,943,198 | A | 8/1999 | Hirsh et al. |
| 5,956,218 | A | 9/1999 | Berthold |
| 5,963,408 | A | 10/1999 | Neiger et al. |
| 6,040,967 | A | 3/2000 | DiSalvo |
| 6,052,265 | A | 4/2000 | Zaretsky et al. |
| 6,226,161 | B1 | 5/2001 | Gershen et al. |
| 6,246,558 | B1 | 6/2001 | DiSalvo et al. |
| 6,252,407 | B1 | 6/2001 | Gershen |
| 6,282,070 | B1 | 8/2001 | Ziegler et al. |
| 6,288,882 | B1 | 9/2001 | DiSalvo et al. |
| 6,309,248 | B1 | 10/2001 | King |
| 6,324,043 | B1 | 11/2001 | Turner |
| 6,381,112 | B1 | 4/2002 | DiSalvo et al. |
| 6,437,700 | B1 | 8/2002 | Herzfeld et al. |
| 6,437,953 | B2 | 8/2002 | DiSalvo et al. |
| D462,660 | S | 9/2002 | Huang et al. |
| 6,580,344 | B2 | 6/2003 | Li |
| 6,590,753 | B1 | 7/2003 | Finlay |
| 6,621,388 | B1 | 9/2003 | Macbeth |
| 6,646,838 | B2 | 11/2003 | Ziegler et al. |
| 6,657,834 | B2 | 12/2003 | DiSalvo |
| 6,671,145 | B2 | 12/2003 | Germain et al. |
| 6,693,779 | B2 | 2/2004 | DiSalvo |
| 6,717,782 | B2 | 4/2004 | DiSalvo et al. |
| 6,771,152 | B2 | 8/2004 | Germain et al. |
| 2003/0151478 | A1 | 8/2003 | Radosavijevic et al. |

* cited by examiner

ALCI WITH RESET LOCKOUT AND INDEPENDENT TRIP

CROSS REFERENCE TO RELATED APPLICATIONS

This application is related to commonly owned application Ser. No. 09,812,288, filed Mar. 20, 2001, entitled Circuit Interrupting Device with Reset Lockout and Reverse Wiring Protection and Method of Manufacture, by inventors Steven Campolo, Nicholas DiSalvo and William R. Ziegler, which is a continuation-in-part of application Ser. No. 09/379,138 filed Aug. 20, 1999, which is a continuation-in-part of application Ser. No. 09/369,759 filed Aug. 6, 1999, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/812,875, filed Mar. 20, 2001, entitled Reset Lockout for Sliding Latch GFCI, by inventors Frantz Germain, Stephen Stewart, David Herzfeld, Steven Campolo, Nicholas DiSalvo and William R. Ziegler, which is a continuation-in-part of application Ser. No. 09/688,481 filed Oct. 16, 2000, all of which are incorporated herein in their entirety by reference.

This application is related to commonly owned application Ser. No. 09/812,624, filed Mar. 20, 2001, now U.S. Pat. No. 6,671,145, entitled Reset Lockout Mechanism and Independent Trip Mechanism for Center Latch Circuit Interrupting Device, by inventors Frantz Germain, Steven Stewart, Roger Bradley, David Chan, Nicholas L. DiSalvo and William R. Ziegler, herein incorporated by reference.

This application is related to commonly owned application Ser. No. 09/379,140 filed Aug. 20, 1999, which is a continuation-in-part of application Ser. No. 09/369,759, filed Aug. 6, 1999, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/813,683, filed Mar. 21, 2001, now U.S. Pat. No. 6,693,779, entitled IDCI With Reset Lockout and Independent Trip, by inventor Nicholas DiSalvo, having which is incorporated herein in its entirety by reference.

This application is related to commonly owned application Ser. No. 09/813,412, filed Mar. 21, 2001, entitled Pivot Point Reset Lockout Mechanism For A Ground Fault Circuit Interruper, by inventors Frantz Germain, Stephen Stewart, Roger Bradley, Nicholas L. DiSalvo and William R. Ziegler, herein incorporated by reference.

BACKGROUND

1. Field

The present application is directed to resettable circuit interrupting devices without limitation ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms. More particularly, certain embodiments of the present application are directed to ALCIs and IDCIs that include a reset lock out portion capable of preventing the device from resetting under certain circumstances.

2. Description of the Related Art

Many electrical appliances have an electrical cord having a line side, which is connectable to an electrical power supply, and a load side that is connected to the appliance, which is an electrical load. Certain appliances may be susceptible to immersion in a conductive fluid, which may present a shock hazard. Other fault scenarios may be addressed by other circuit interrupters alone or in combination. Accordingly, the electrical wiring device industry has witnessed an increasing call for circuit breaking devices or systems which are designed to interrupt power to various loads, such as household appliances, consumer electrical products and branch circuits. In particular, appliances utilized in areas that may be wet, such as hair dryers, may be equipped with an IDCI to protect against immersion hazards. Such products have been marketed by companies under brand names including Windmere and Wellong.

SUMMARY

The present application relates to a resettable circuit interrupting devices.

In one embodiment, the circuit interrupting device includes a user interface. Before the device is used, it is tripped. The user must then use the user interface to enable a test actuator to initiate a test the device. If the test passes, the device will reset. Otherwise, the device will be locked out. In another embodiment, the device may be tripped by a user interface to a mechanical trip mechanism.

One embodiment for the circuit interrupting portion uses an electro-mechanical circuit interrupter to cause electrical discontinuity in at least one of the phase and neutral conductive paths of the device, and sensing circuitry to sense the occurrence of a predetermined condition. The mechanical trip arm may be configured to facilitate mechanical breaking of electrical continuity in the phase and/or neutral conductive paths, if the trip actuator is actuated. Furthermore, the mechanical trip arm or level may be configured so that it will not be operable to reset the device.

BRIEF DESCRIPTION OF THE DRAWINGS

Preferred embodiments of the present application are described herein with reference to the drawings in which similar elements are given similar reference characters, wherein.

DETAILED DESCRIPTION OF EMBODIMENTS

Figure 1A:
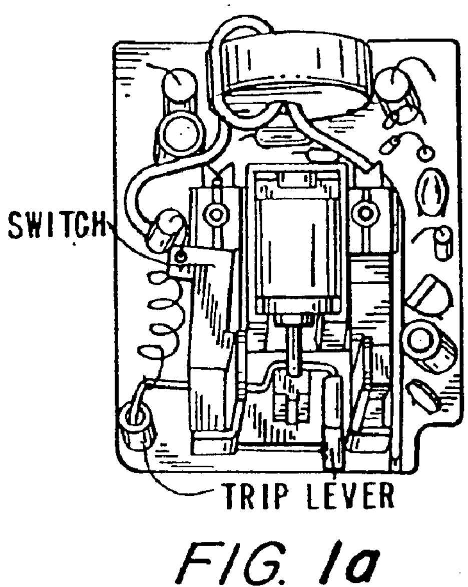
FIGS. 1*a* and FIG. 1*c* are perspective views of an ALCI according to an embodiment of the present invention.
Figure 1B:
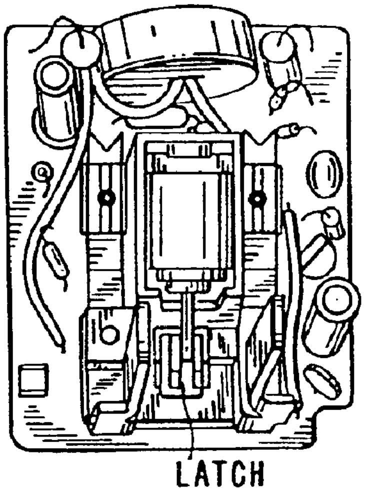
FIGS. 1*b* and FIG. 1*d* are perspective views of an ALCI such as a Windmere/TRC ALCI.
Figure 1C:
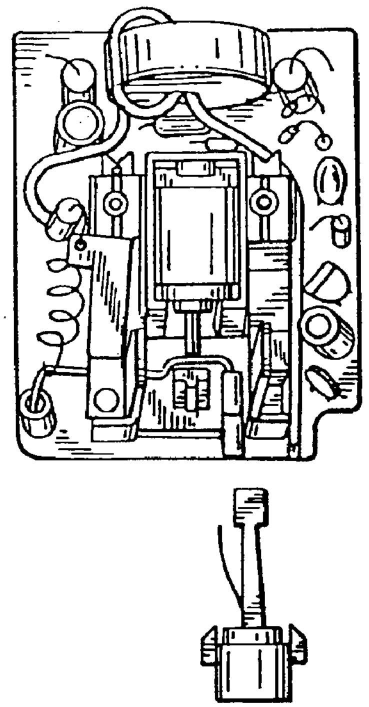
Figure 1D:
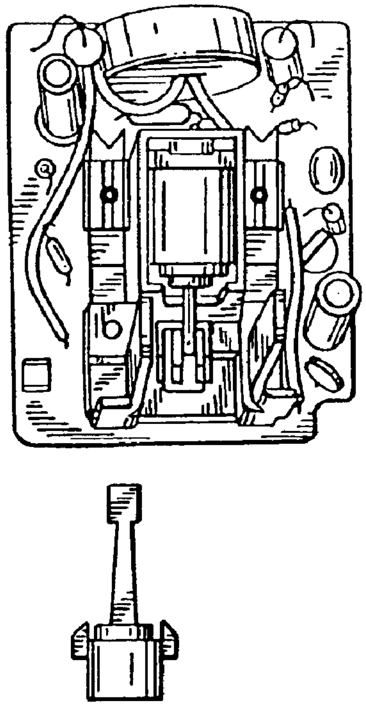

Referring to FIGS. 1*b* and 1*d*, a conventional ALCI is shown. Referring to FIGS. 1*a* and 1*c*, an ALCI according to an embodiment of the present invention is shown. Reset Lockout prevents a the ALCI from being reset if the device is not functional (or if the device has no power). It utilizes the same electromechanical system to allow reset as was designed to accomplish a trip if a fault were detected. The Mechanical Trip allows a defective or unpowered device to be tripped. A tripped device is a positive indicator to a lay person that the device is defective when the device can't be reset, whereas if the device were to remain operational, it could be mistaken to be safe.

The embodiment differs from the conventional unit as follows. The latch no longer has a "lead-in" taper, causing a tab that is similar to the holding latch edge. (This causes the latch to operate in a similar manner in the reset mode as in the trip mode.) The "test" switch is moved from the external location to an internal point that will operate when a reset is attempted by detecting the extending of the moveable are of the switched contacts. This arm moves as a result of the force applied to the moveable contact assembly by the tab created on the latch. A mechanical trip lever is added in place of the former test switch.

The embodiment operates as follows. The mechanical Trip is operated to insure that the test is exercised and that the device is put into a tripped state so that if the device is not functional it will not operate. With the unit powered, the reset button is depressed. This pushes the moveable contacts further apart causing the test contact to close, invoking the test cycle. If the test functioned properly, firing the solenoid released the latch from the lockout position, in the same manner as it would have released the latch from the reset position. If the test had failed the latch would not have been released from the lockout position and the device would be remain in the safe state. The latch, under manual pressure, travels to the armed side of the moveable contacts, also because the moveable contacts are no longer being forced apart the test switch opens ending the test cycle. The cycle is completed when the reset button is released closing the moveable contacts and powering the device.

Figure 2A:
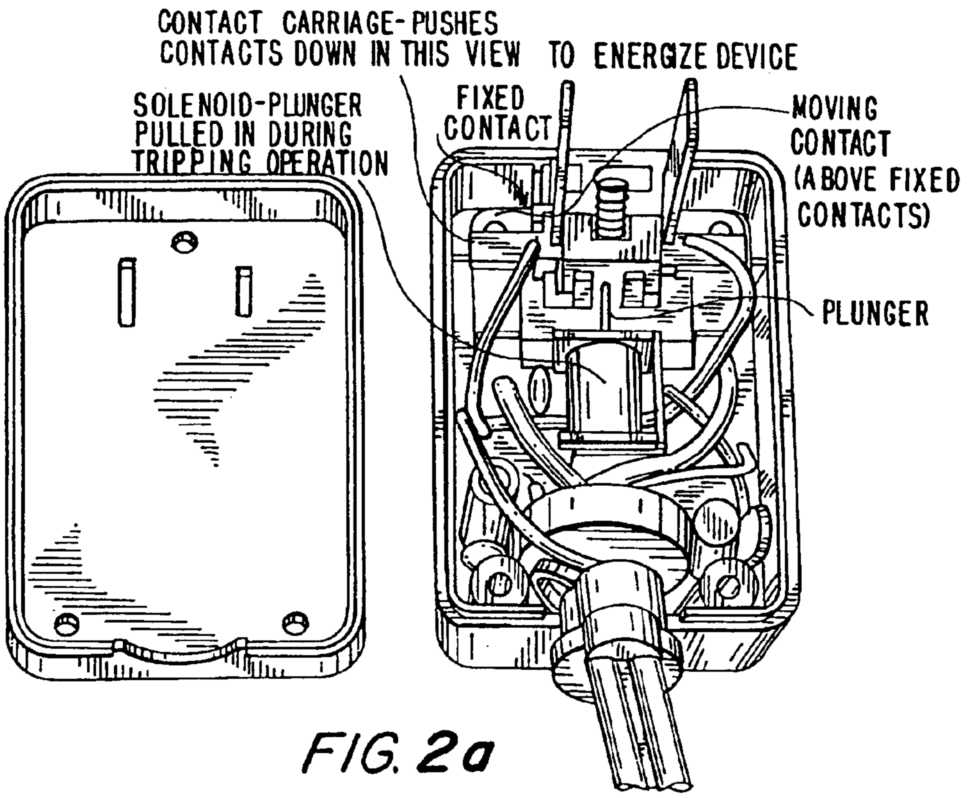
FIGS. 2*a*–2*e* are perspective views of an IDCI such as Konhan Industries IDCI Catalog No. 303-0118.
Figure 2B:
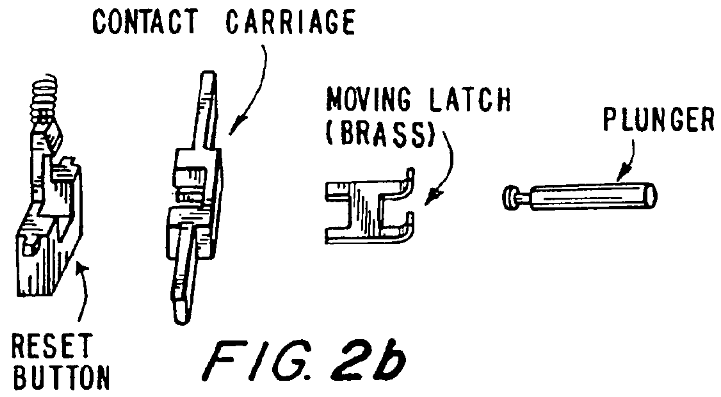
Figure 2C:
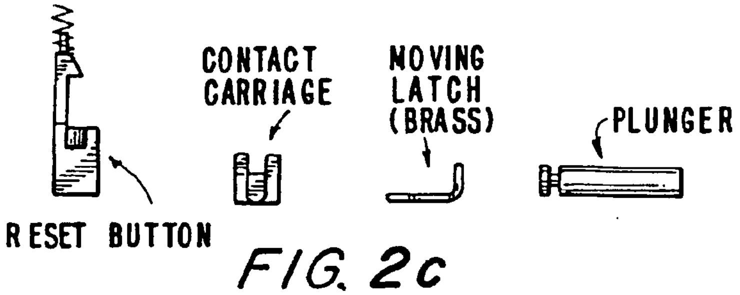
Figure 2D:
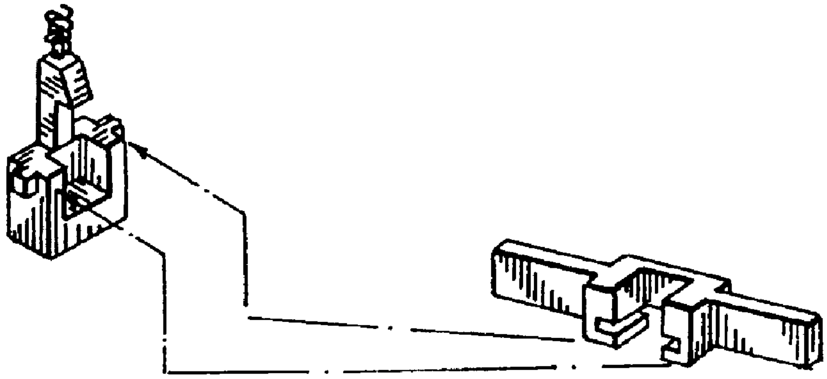
Figure 2E:
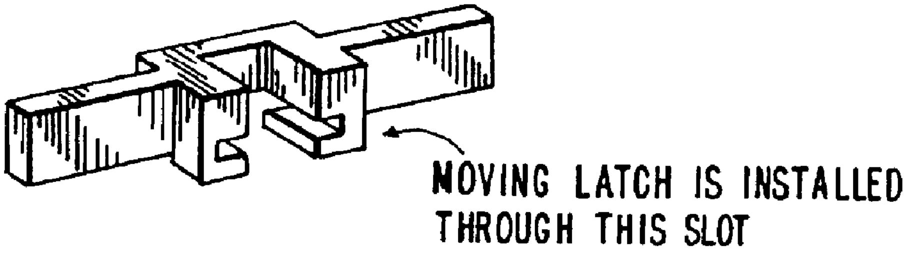
Figure 2F:
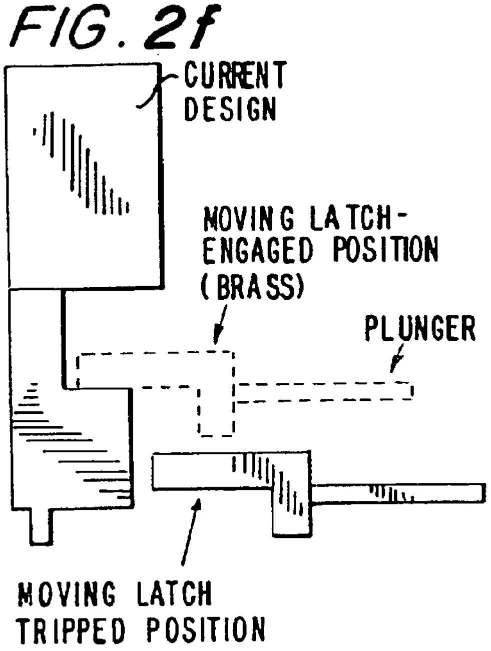
FIGS. 2*f*–2*g* are views of an IDCI according to an embodiment of the present invention.
Figure 2G:
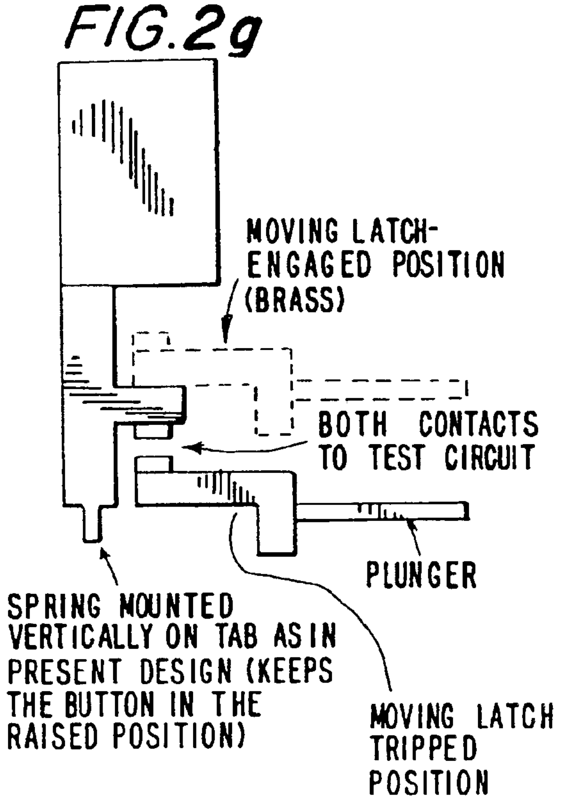
Figure 2H:
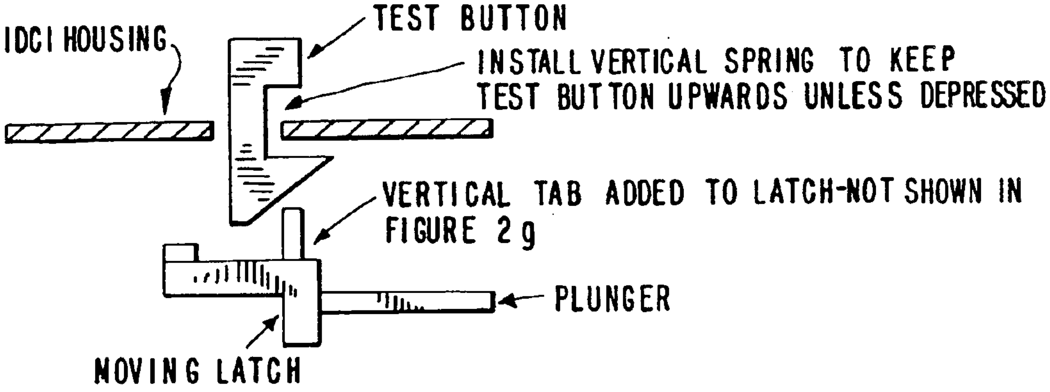
FIG. 2*h* is a view of an IDCI of an embodiment of the present invention.

FIGS. 2a–2f show a conventional IDCI and FIGS. 2h—2h show an IDCI according to an embodiment of the present invention incorporating a Reset Lockout and a Mechanical Test method.

FIG. 2a is a view of a complete conventional IDCI for a hairdryer.

FIG. 2b is an exploded view of latching mechanism. The plunger neck is installed between the two arms of the moving latch when the device is fully assembled. The moving latch slides into the Contact Carriage (it is fully in the left direction when in the on state and momentarily pulled to the rights in the tripping operation). The moving latch secures the contact carriage to the reset button on the on state.

FIG. 2c is a side view of FIG. 2b. The Moving Latch is installed through the Contact Carriage and the protruding end latches onto the Reset button just below the step on the Reset Button in this view.

FIG. 2d is a close up exploded view of the Reset button (left) and the Contact Carriage (right). The arrows show how the two are attached together in the On state by the Moving Latch.

FIG. 2e is a close up picture and drawing of the Contact Carriage.

FIG. 2f is a conventional design of the IDCI Reset button and FIG. 2g is an embodiment of the present invention (Mechanical Test Method not shown). In the embodiment, the step of the Reset Button will now catch the Moving Latch on its under side in addition to catching on its upper side. If the device is in the Tripped state, pushing the Reset button downward by hand would close the Test Circuit contacts and the plunger would pull to the right. If the solenoid is operational, the plunger would cause the Test contacts to open (preventing repeated firing of the solenoid). The Reset button can then be further pressed downward by hand until the stop would catch the Moving Latch on the underside of the Moving Latch and pull it upwards with the Contact Carriage and put the device online. The moving latch is pushed towards the left in this view by the action of a spring which allows it to be propelled to the left once it has cleared the step of the Reset button on either the top or bottom of this step. The Contact Carriage may be slightly modified to accommodate the new Test contacts. The Mechanical Test Method, illustrated in FIG. 2g, calls for the addition of a vertical tab on the Moving Latch. This additional tab is not shown here in the interest of simplicity.

FIG. 2h is an IDCI of an embodiment of the present invention. Pressing Test button down hit moving latch which has been modified by the addition of the vertical tab and moves the latch to the right in the same manner as the plunger.

Figure 3A:
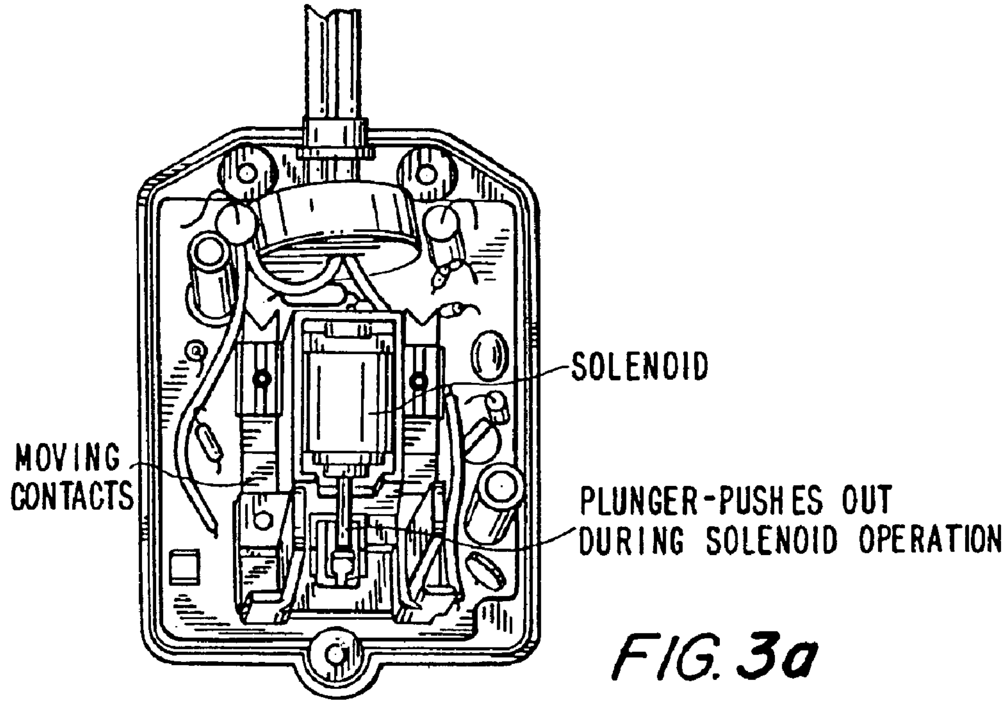
FIGS. 3*a*–3*f* are perspective views of an IDCI such as Electric shock Protection Catalog Nos. ESP-12 and ESP-31.
Figure 3B:
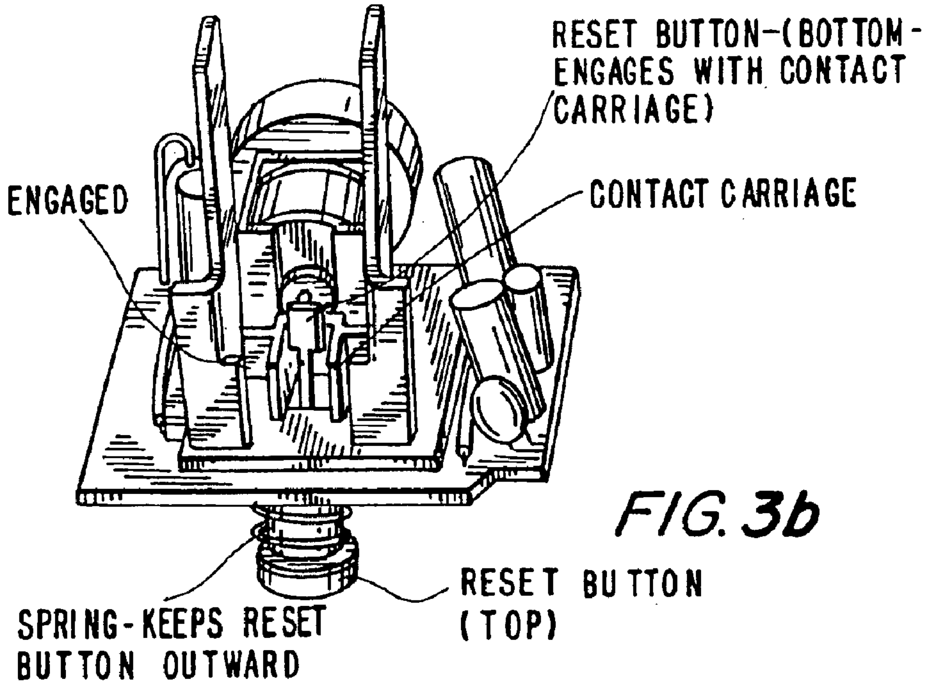
Figure 3C:
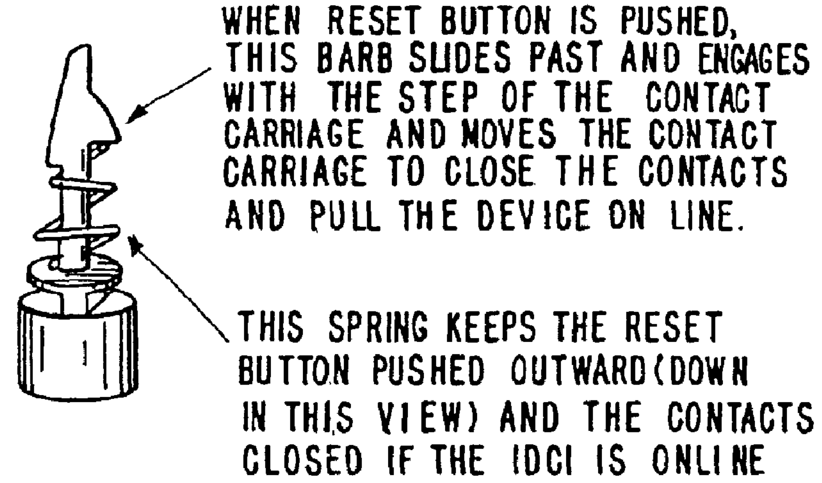
Figure 3D:
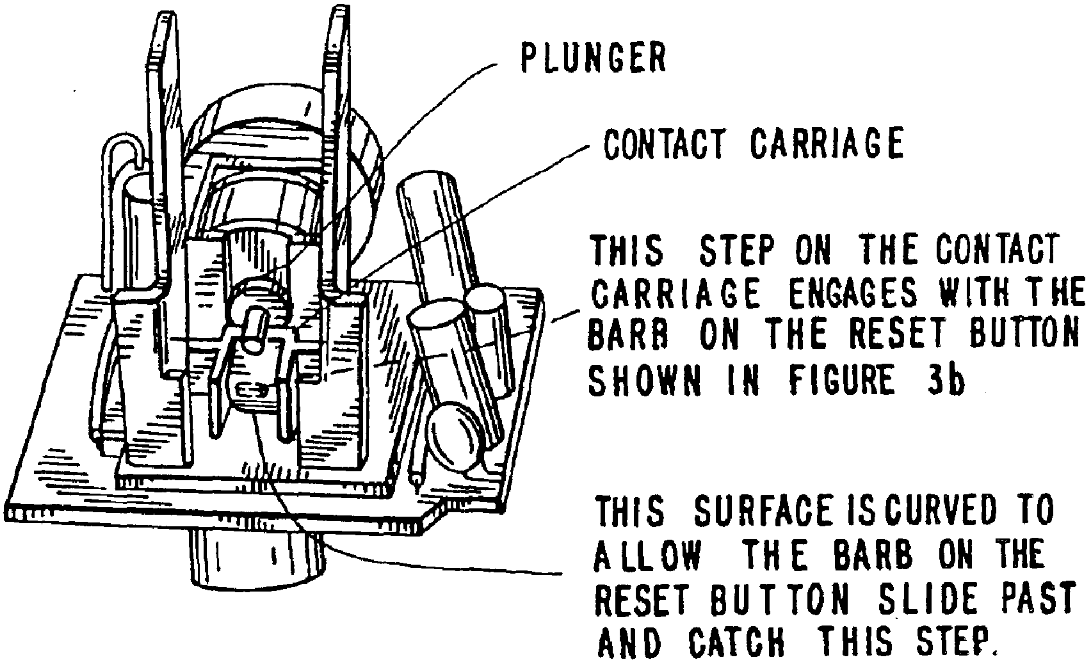
Figure 3E:
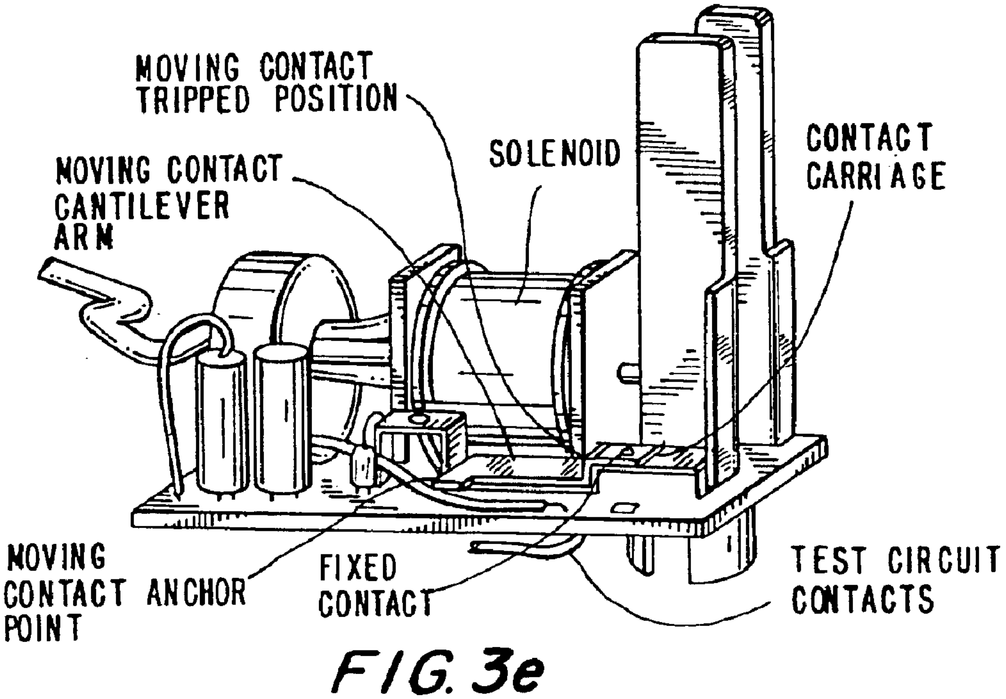
Figure 3F:
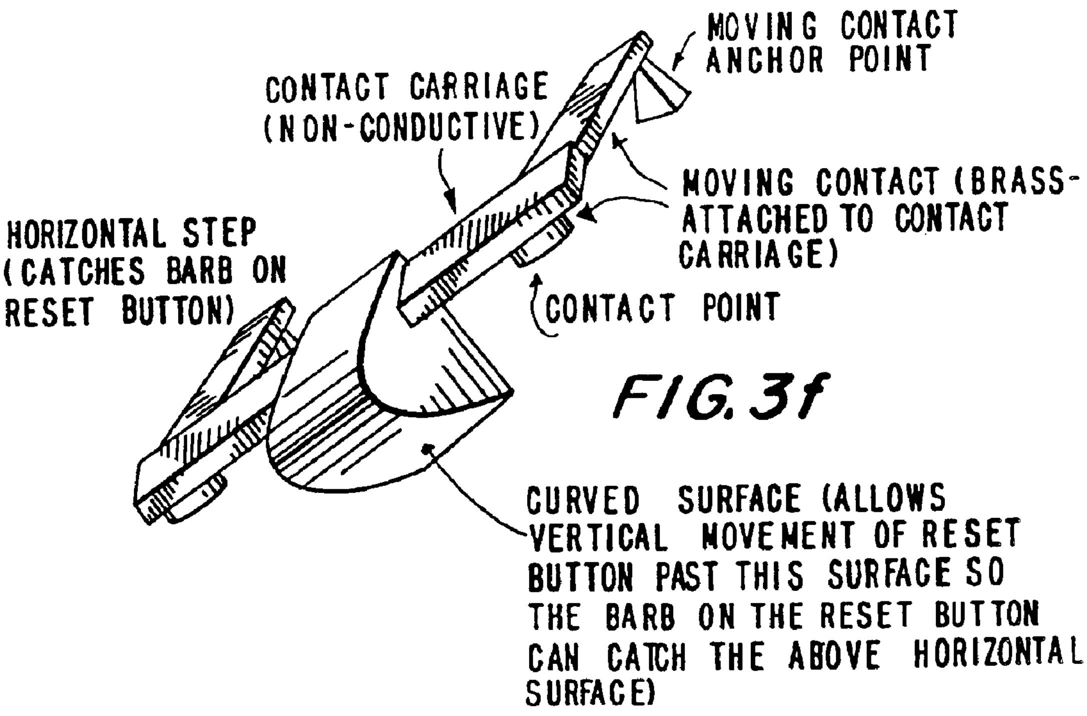
Figure 3G:
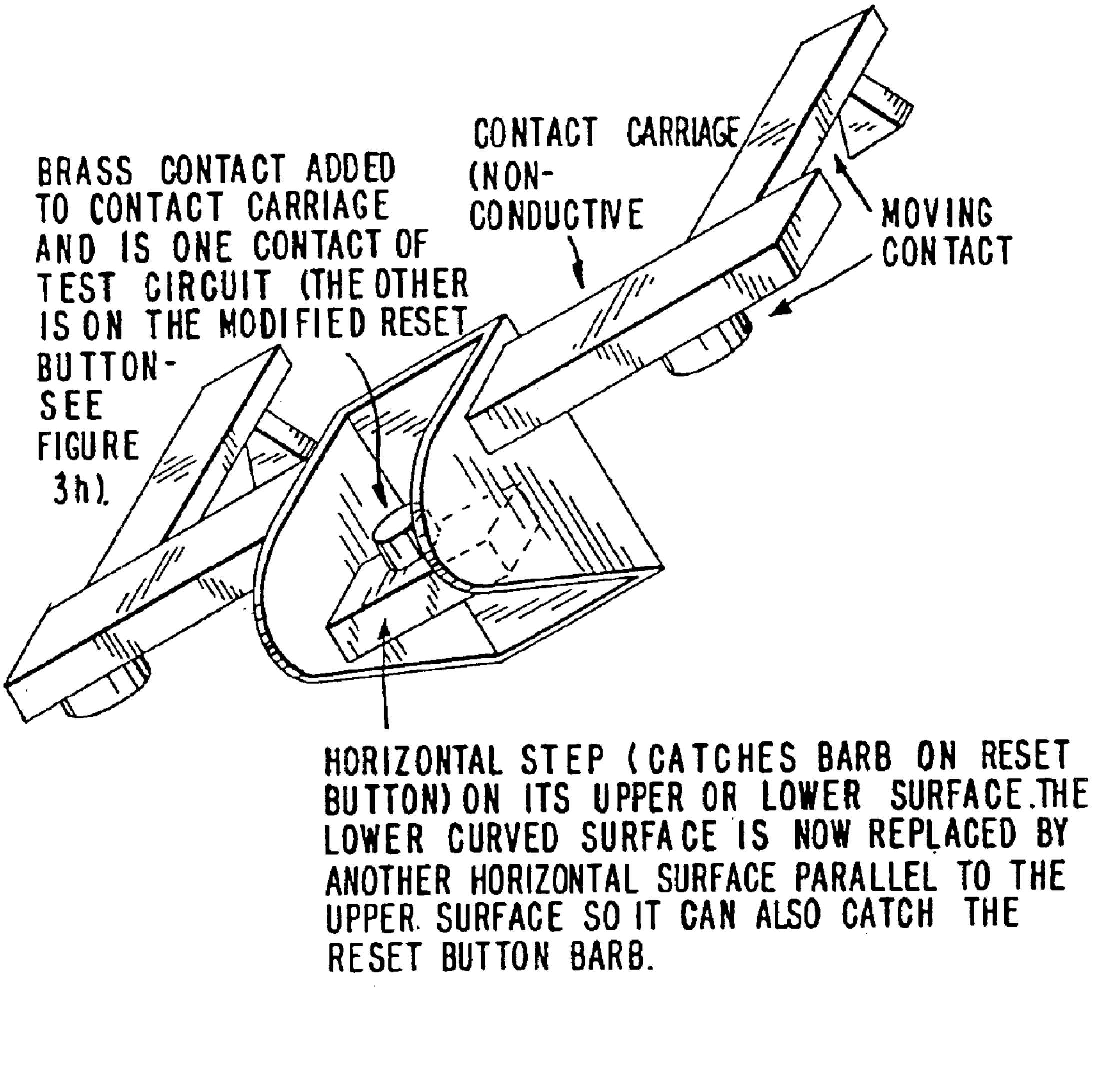
FIGS. 3*g*–3*h* are perspective views of an IDCI according to an embodiment of the present invention.
Figure 3H:
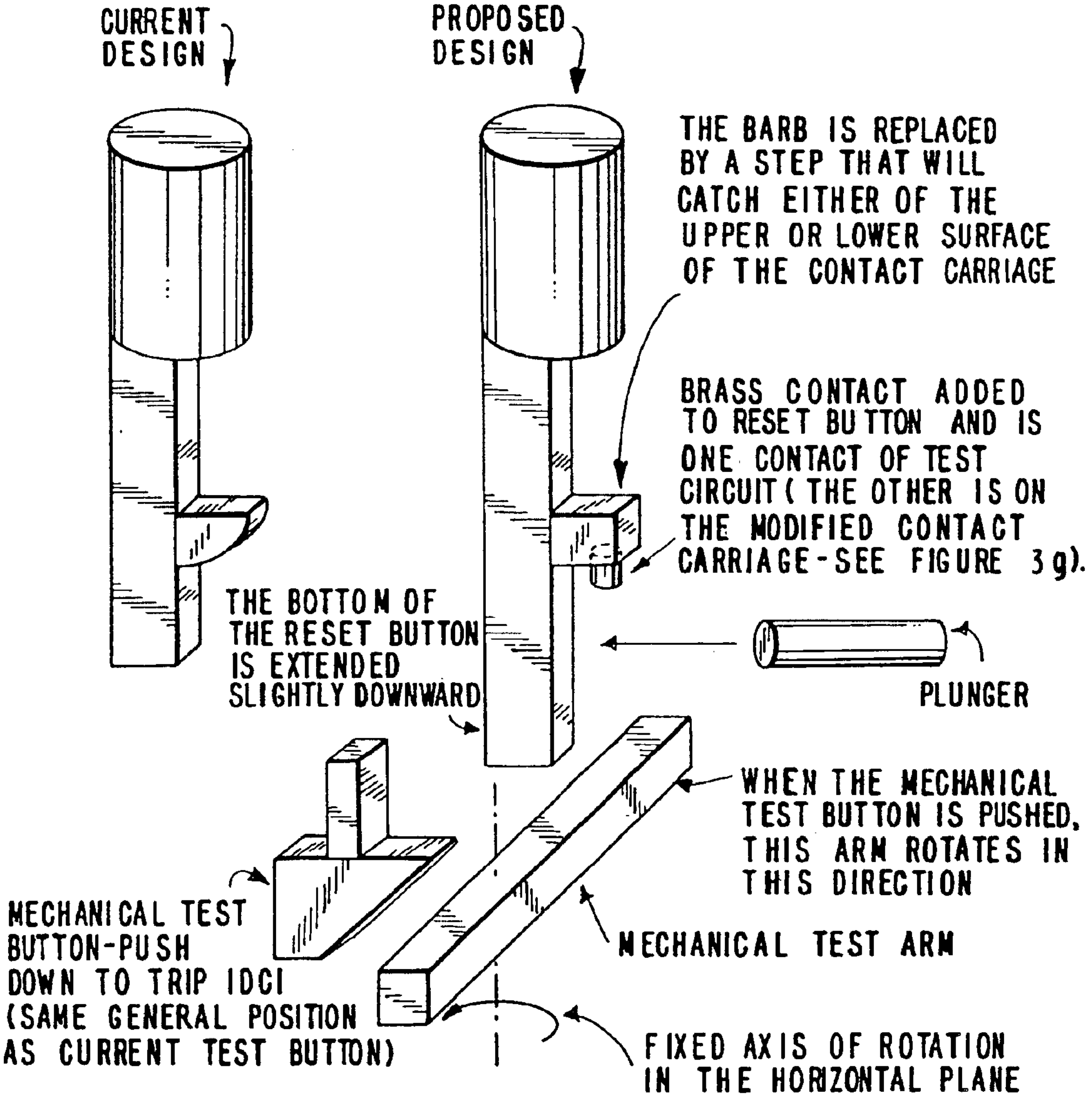

FIGS. 3a–3f illustrate the current design of the conventional IDCI and FIGS. 3g–3h illustrate the IDCI according to the embodiment of the present invention incorporating the reset lockout feature and a mechanical test method.

FIG. 3a is a view of complete IDCI. Please note that the solenoid plunger is pushed outward during tripping operation.

FIG. 3b is a front view of a conventional IDCI.

FIG. 3c is a close up view of reset button (shown upside-down).

FIG. 3d is the front view of the IDCI with the Reset button removed (shown upside-down).

FIG. 3e is a side view of the IDCI with the reset button removed.

FIG. 3f is a three dimensional drawing of contact carriage.

FIG. 3g modification to contact carriage and reset button (this view is a skewed isometric view).

FIG. 3h is a Drawing of the Reset Button and mechanical Test Method. Method of Operation: If the device is in the tripped state and the Reset button is depressed, the Test contact on the underside of the step on the modified Reset button will make electrical contact with the Test contact that was added to the upper horizontal surface on the Contact Carriage shown in FIG. 3g. When the two Test contacts close, the Solenoid will fire, pushing the lower part of the Reset button to the left in this view causing the step of the Reset button to disengage from the Contact Carriage and the Test contacts to open preventing repeated firing of the solenoid. This will allow the Reset button to be further depressed by hand until the upper surface of the Reset button step engages underneath the lower horizontal surface of the Contact Carriage. When the Reset button is released by the end user, the Contact Carriage is pulled upward (in this view) by the action of the Reset Spring and the device contacts are closed, and the device is pulled on-line. If the Solenoid does not fire, pushing the Reset button will only push the moving contacts further away from the fixed contacts. When Mechanical Test button is depressed, the ramp on the button causes the Mechanical Test Arm to rotate counterclockwise in this view and hit the bottom portion of the Reset button and deflect the reset button in the same manner as the plunger which then disengages the Reset button from the Contact Carriage and opens the device contacts.

Figure 4A:
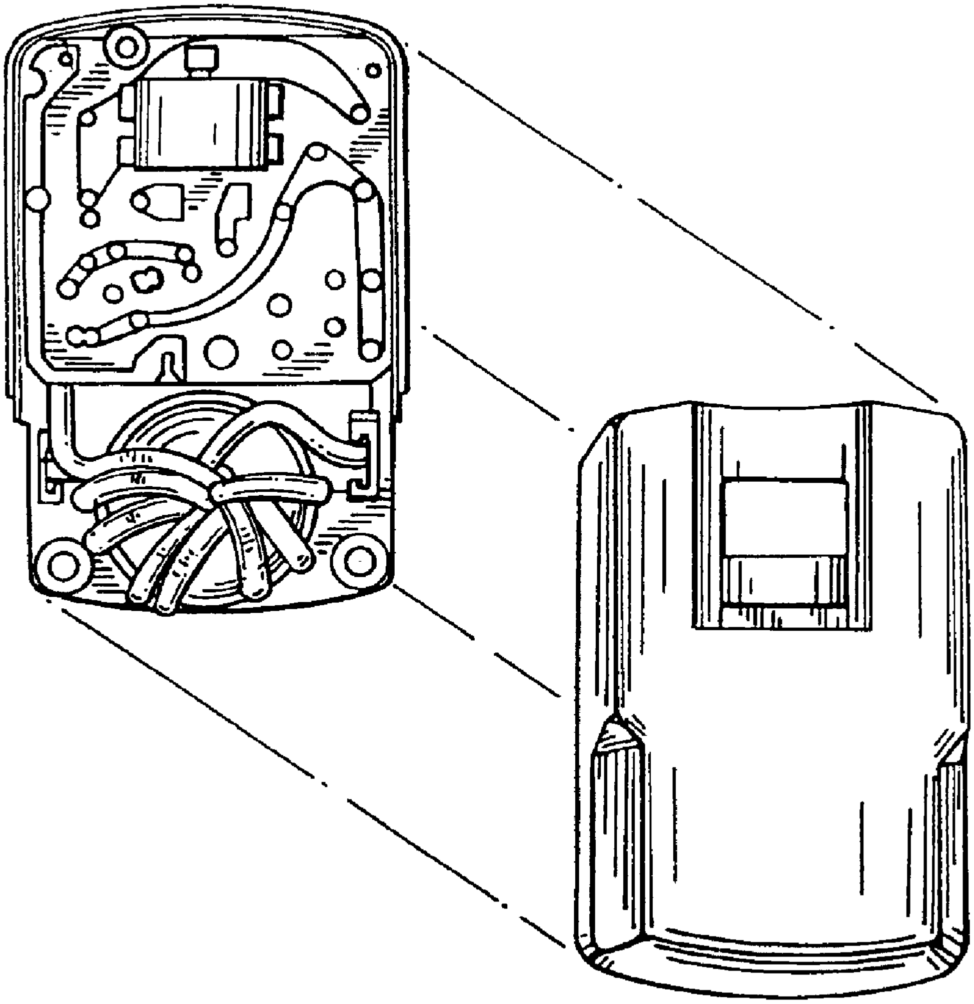
FIGS. 4*a*–4*b* are perspective views of an IDCI such as a Wellong Catalog No. P8S.
Figure 4B:
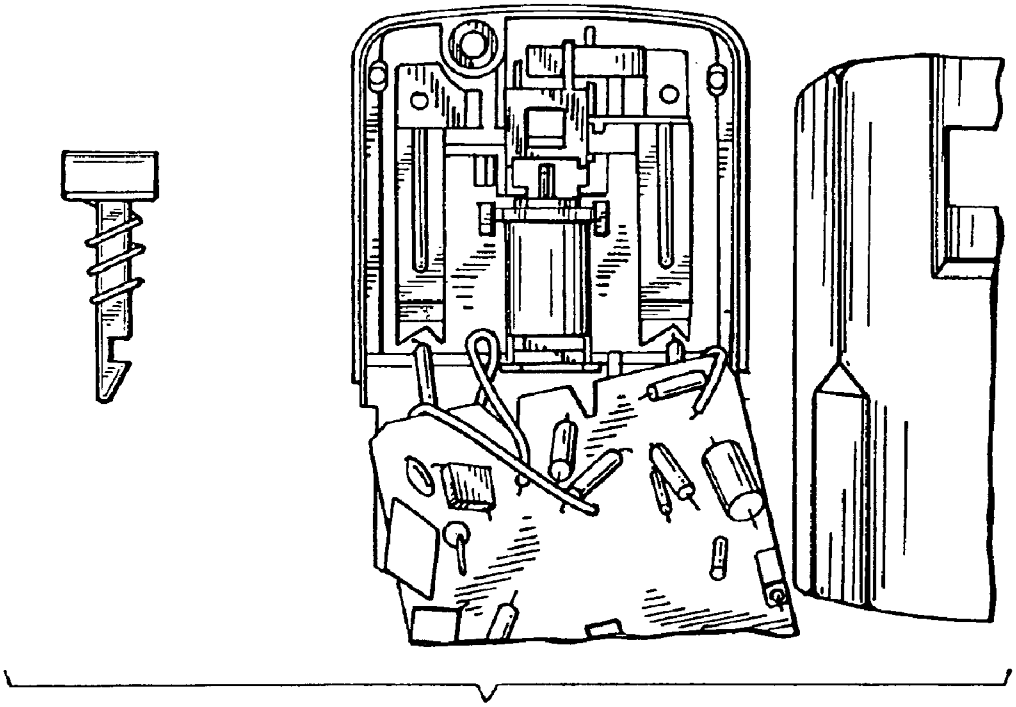
Figure 4C:
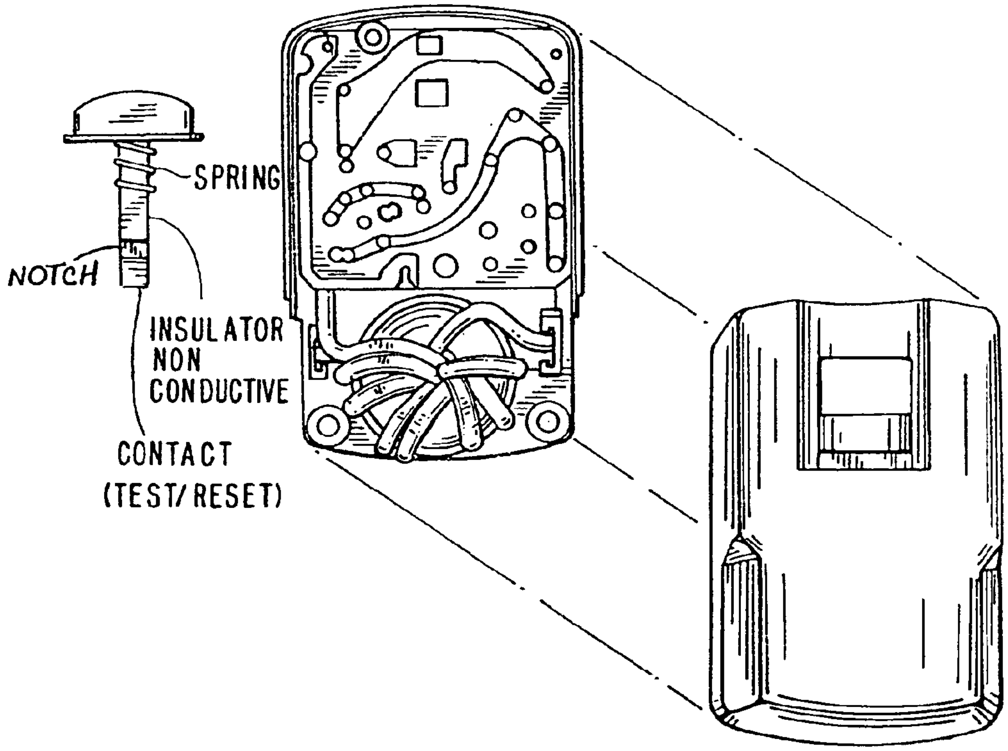
FIGS. 4*c* is a perspective view of an IDCI according to an embodiment of the present invention.

Referring to FIGS. 4*a*–4*b*, a conventional IDCI is shown and in FIG. 4*c*, an IDCI according to an embodiment of the present invention is shown. Another embodiment (not shown) eliminates the "Auxiliary contact" and simplifies any modification of a conventional device as this contact will not require modification.

The embodiment consists of a means to prevent a defective IDCI (GFCI) from being reset causing power to be applied to a device in which the protection has failed.

This device may accomplish the above goal by altering the Auxiliary contact (The contact removes power from the protection circuitry.) such that the end travel of the reset button when the device is in the tripped state opens this contact. This design may allow power to be applied to the protection circuitry when an attempt to reset the device is initiated (The present design open this contact with an arm on the main contact carrier.).

The embodiment may connect the spring latch (The part that is moved by the solenoid.) to the Line Neutral terminal. (This will be used to activate the Test circuitry.)

The embodiment may have a Reset button that differs from the conventional unit as follows: a) Remove the taper on the bottom end, b) Add a contact on the bottom and up the edge that is opposite the notch. Modify the resistor side of the test contact so that it the spring of the reset button makes contact with the reset button and this contact.

The embodiment may modify the function of the test button from an electrical device to a mechanical TRIP function. This may be accomplished by extending a probe from the button through the circuit card to the lever that is operated by the solenoid. The embodiment operates as folllows:

1 The Trip Button is depressed. Due to it being a mechanical function, the device is tripped even if the Protection Circuitry is not functional.

2 Depressing the Reset Button establishes power (if connected) to the protection circuit and is blocked by but makes contact with the spring latch.

3 If the protection circuit is functional, the solenoid activates, admitting the probe of the reset button to pass through the latch, breaking the previously established test contact.

4 The test circuit is deactivated (by the loss of contact) and the solenoid and latch spring return. The Reset button is locked in the Reset position.

5 Releasing the Reset button causes the power contacts to engage, completing the sequence.

The embodiment reset button may be changed as shown in FIG. 4*b* to as shown in FIG. 4*c*. The lead-in taper is changed to a 90° step so that the notch will not engage the latch without relay/solenoid activation.

As noted, although the components used during circuit interrupting and device reset operations are electromechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. An Appliance Leakage Current Interrupter (ALCI) device comprising:

a housing at least partially housing circuit interrupting mechanism;

a manually operable reset switch having a shaft of non-conductive material with a contact on the bottom and up a side of said shaft and opposite a 90 degree notch in said shaft; and said reset switch coupled to said circuit interrupting mechanism whereby the reset switch resets the ALCI after the ALCI has been tripped by the circuit interrupting mechanism and has passed a test initiated by the activation of the reset switch where such test occurs after the ALCI has been tripped.

* * * * *

UNITED STATES PATENT AND TRADEMARK OFFICE

CERTIFICATE OF CORRECTION

PATENT NO. : 6,937,451 B2
DATED : August 30, 2005
INVENTOR(S) : Richard J. Ulrich et al.

It is certified that error appears in the above-identified patent and that said Letters Patent is hereby corrected as shown below:

Title page,
Item [75], Inventors, replace "Nicholas L. Disalvo" with -- Nicholas L. DiSalvo --.

Signed and Sealed this

Eighth Day of November, 2005

JON W. DUDAS
*Director of the United States Patent and Trademark Office*